J. W. MANN.
Seeding Machine.
No. 228,913  Patented June 15, 1880.
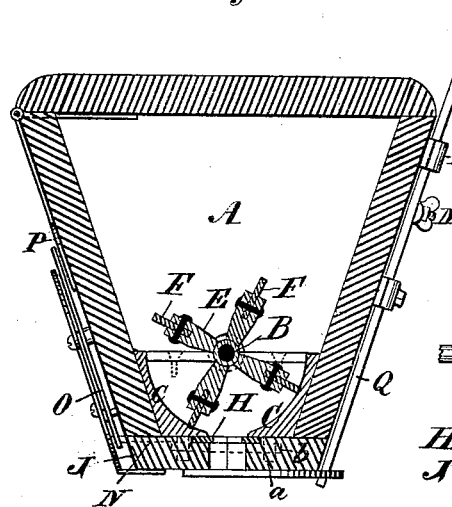
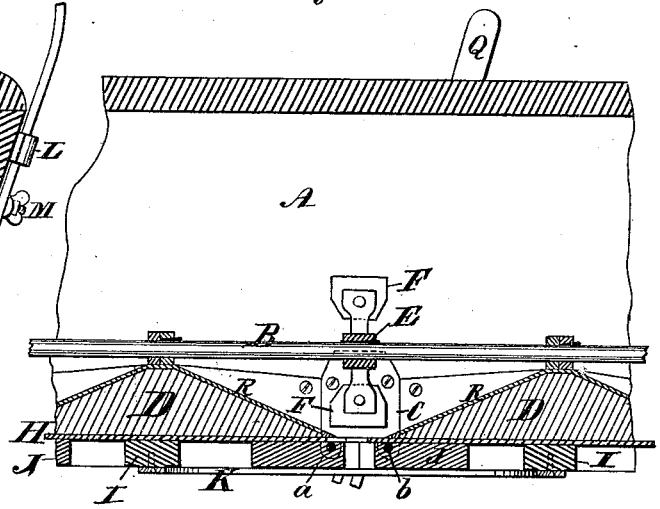
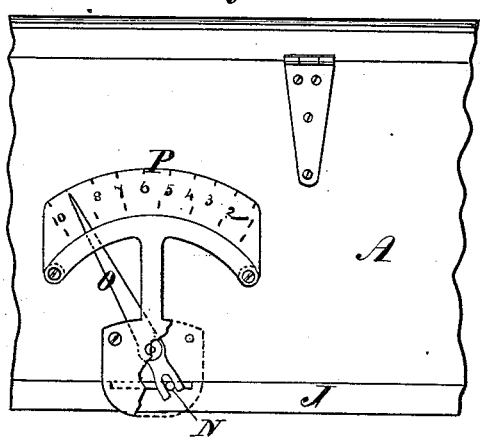
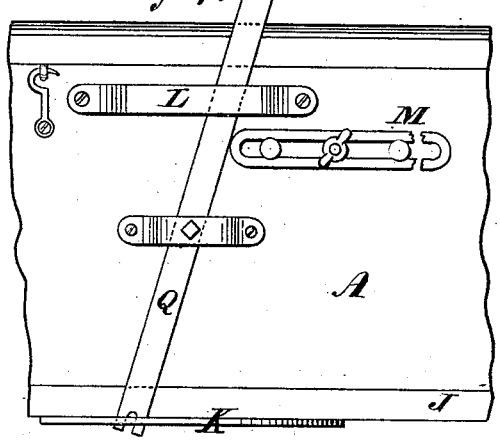
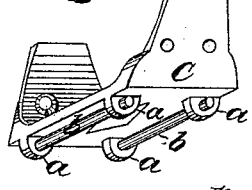
Witnesses:
John Grist
Fred J. Ross
Inventor
J. W. Mann
per Henry Grist
Attorney.

UNITED STATES PATENT OFFICE.

JAMES W. MANN, OF BROCKVILLE, ONTARIO, CANADA.

SEEDING-MACHINE.

SPECIFICATION forming part of Letters Patent No. 228,913, dated June 15, 1880.

Application filed February 10, 1880.

*To all whom it may concern:*

Be it known that I, JAMES WALTER MANN, of Brockville, in the county of Leeds, in the Province of Ontario, Canada, have invented certain new and useful Improvements on Seeding-Machines; and I do hereby declare that the following is a full, clear, and exact description of the same.

This invention relates to the hopper of a seed-sower, for attachment to the frame of a horse-rake, &c., or mounted on a separate machine; and the object of this invention is to prevent liability of the seed clogging the discharge-aperture, and to insure uniform distribution to the degree to which a sliding contracting of the discharge-apertures may be set; and my invention consists of a hopper for seed-sowers having a bottom composed of sectional castings internally semicircular and externally flat at the bottom, with sides corresponding to the inclination of the internal slope of the sides of the hopper, each having a seed-discharge aperture and intermediately blocks internally beveled or inclined toward the seed-apertures and flat on the exterior bottom, uniform with the castings, which, on the exterior bottom, have lugs, through which bolts are passed to bear intermediately with the bottom a perforated slide, by which the discharge of seed is regulated; also, of agitator-wheels within the hopper, mounted on a longitudinal shaft, said wheels provided with flexible blades to sweep the seed-apertures without injury to the seed; also, in the combination, with the hopper, of a perforated seed-slide secured to blocks sliding in slots in an outer casing affixed to the bottom of the hopper and connected by an arm to a lever for operating the slide, and a pointer to indicate on a scale the adjustment of the slide to the quantity of seed to be sown.

Figure 1 is a transverse vertical section of my improved seed-sower hopper. Fig. 2 is a longitudinal vertical section of the central portion of the hopper. Fig. 3 is a rear elevation of the same. Fig. 4 is a front elevation of the same; and Fig. 5 is a perspective view of the seed-aperture casting for the bottom of the hopper.

A is the seed-hopper, to be attached to a wheeled frame or to a horse hay-rake between the wheels parallel with the axle. B is a longitudinal shaft journaled in the hopper A, and having outside the same a cog-wheel to mesh with a cog-wheel on the hub of the ground-wheel, or other suitable contrivance for rotating the same.

C are castings of metal, fitting across the hopper, and forming a portion of its bottom. Its face within the hopper is semicircular, the exterior bottom flat, and the sides incline outwardly to conform to the interior sides of the hopper, to which it is secured by wood-screws or other fastenings. The remaining portions of the bottom of the hopper between the castings C are filled with wooden blocks D, which internally bevel toward the castings C, the external bottom of the blocks being flat to correspond with the exterior bottom of the castings C, whereby a smooth exterior surface is formed the whole length of the hopper bottom. The castings C have a diamond-shaped seed-aperture at the bottom, and at which location the metal tapers to a thin edge.

On the exterior bottom the castings have lugs $a$, through which pass bolts $b$, fixed by keys. These bolts support a thin metal slide, H, running along the whole length of the hopper, close against the bottom of the castings C, and which slide has diamond-shaped perforations corresponding to the apertures in the castings C, so that by moving the slide longitudinally, as hereinafter described, the seed-apertures are diminished or enlarged to sow the required quantity of seed. On the shaft B is mounted, over each seed-aperture, a wheel, E, having radial arms, provided on the extremity with a blade, F, of sheet rubber or other flexible material, which sweeps the concavity of the castings C and prevents the seed-apertures from becoming choked, the blades yielding when in contact with foreign substances in the seed, and preventing the seeds from being crushed by such contact.

The slide H is provided between two of the seed-apertures with blocks I I, which slide in slots in a false bottom, J, secured to cover the seed-bottom of the hopper. The blocks I are connected by a metal plate, K, which curves so as to project beyond the front of the hopper, into which plate a lever, Q, fulcrumed to the front side of the hopper, is stepped, so that by moving the lever the slide is operated to contract or enlarge the seed-opening, as may be desired. The lever works in a guide, L, in the front of the hopper, and is held fixedly by a clamp, M, or other suitable contrivance.

Rearward the slide is provided with an arm, N, which projects beyond the back of the hopper and connects with a pointer, O, pivoted to the hopper, which is provided with a dial-plate, P, to indicate the adjustment of the slide to the quantity of seed per acre to be sown.

For utility the blocks D may be covered with metal sheets R which lap over the joints of the castings and blocks, the castings being made with a suitable recess to receive the overlap of the sheet metal and form a tight joint with a uniformly even surface.

I claim as my invention—

1. A seed-sower hopper having its bottom composed of sectional castings C, with upper face semicircular and sides outwardly inclined, lower face flat, with lugs $a$ cast thereon, and perforated at center, as described, and intermediate inclined blocks, D, with metal coverings R, substantially as described and set forth.

2. In combination with castings C, having lugs $a$ and bolts $b$, and false bottom J J, the slide H, with apertures corresponding to those in castings C, blocks I I, plate-connection K, and lever Q, operating for the adjustment of the slide, substantially as described and shown.

3. The combination of lever Q, fulcrumed to the front of the seed-hopper, as described, plate K, with connecting-blocks I I, slide H, with arm N, and pointer O, connecting therewith and moving over a fixed dial, P, to indicate the adjustment of the slide when operated substantially as described and set forth.

4. In a seed-sower, the agitator-wheels E, with their blades at right angles to one another, mounted on a longitudinal shaft, B, within the hopper, and provided with flexible rubber extensions F, substantially as and for the purpose set forth.

J. W. MANN.

Witnesses:
T. A. ELLIOTT,
W. J. WRIGHT.